(No Model.)

W. BRADFORD.
POTATO DIGGER.

No. 365,574. Patented June 28, 1887.

Attest.
F. D. Cortich
John H. Hopkins

Inventor.
Wm. Bradford, Jr.
R. F. Osgood, Atty.

N. PETERS, Photo-Lithographer, Washington, D. C.

UNITED STATES PATENT OFFICE.

WILLIAM BRADFORD, OF BROCKPORT, NEW YORK.

POTATO-DIGGER.

SPECIFICATION forming part of Letters Patent No. 365,574, dated June 28, 1887.

Application filed December 27, 1886. Serial No. 222,546. (No model.)

*To all whom it may concern:*

Be it known that I, WILLIAM BRADFORD, of Brockport, in the county of Monroe and State of New York, have invented a certain new and useful Improvement in Potato-Diggers; and I do hereby declare that the following is a full, clear, and exact description of the same, reference being had to the drawings accompanying this specification.

My improvement relates to potato-diggers in which two inclined blades are used which center to the rear, and shakers are attached to the ends of the blades and receive a shaking motion to work the potatoes from the ground.

The invention consists in the following construction and arrangement, by which the shakers receive a peculiar movement that gathers the potatoes in a line behind the machine, and the vines are carried back by alternately-swinging forks to the rake behind.

Figure 1:
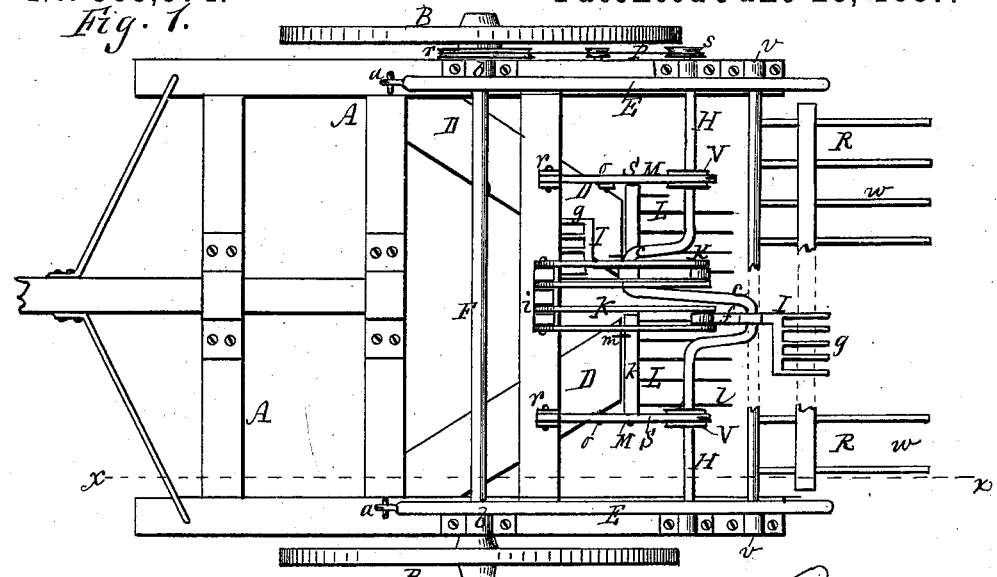
Figure 2:
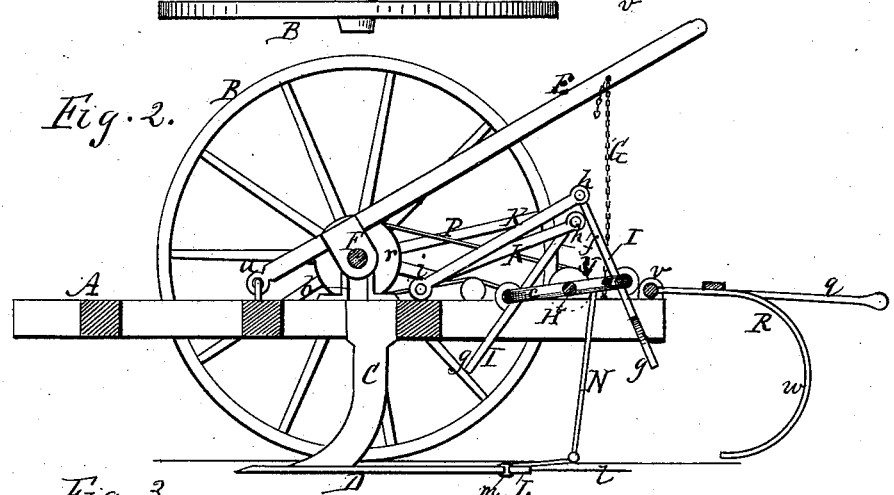
Figure 3:
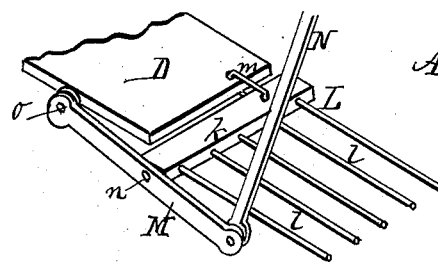
Figure 4:
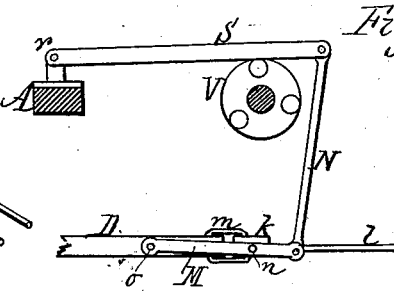

In the drawings, Figure 1 is a plan view of the machine. Fig. 2 is a longitudinal vertical section of the same. Fig. 3 is a perspective view of the devices for operating the shaker. Fig. 4 is a side elevation of the devices for operating the shaker.

A indicates the frame of the machine, and B B the supporting-wheels.

C C are the shanks, and D D the blades or cutters that run under the hills and raise the potatoes. These cutters are flat horizontal blades and are placed in the inclined position shown, the front ends being wide apart and the rear ends nearly meeting. As the cutters pass under the hills the potatoes are gathered at the rear and pass over the cutters.

E E are two levers on opposite sides of the frame, jointed at their front ends to the frame, as shown at *a a*, and having their fulcrum on the axle F. The axle rests in slotted boxes *b b* at the sides of the frame. By raising or lowering the rear ends of the levers the frame, and with it the cutters, will be raised or lowered to change the depth of cut. The levers are held at any adjustment by chains G G.

My improvement is as follows:

H is a shaft crossing the frame in the rear of the driving-wheels. This shaft has two cranks, *c c*, standing reversely to each other, for giving motion to the swinging forks. The cranks are formed by bending the shaft, as shown.

I I are the two forks. Each consists of a straight shank, *f*, and a fork, *g*, at the lower end. The upper ends of the shanks are jointed at *h* to rock-bars K K, which are pivoted at their front ends to the frame, as shown at *i*. Centrally the forks are jointed to the cranks *c c*.

It will be seen that as the cranks are turned the forks will alternately sweep forward and back, and will also move up and down. In the reverse movement the forks rise and then dive down in front of the vines that gather on the cutters, then move backward, carrying the vines with them, and then rise again to free from the vines, this action being constant so long as the machine is in use. By this means the vines are all swept back and are kept from clogging the machine.

L L are two shakers in the rear of the cutters D D, and attached thereto so as to vibrate up and down. Each of these shakers consists of a bar, *k*, and rearwardly-projecting teeth *l l*. At the inner end the bar *k* is loosely jointed to the end of the cutter by a link, *m*. At the outer end the bar is jointed at *n* to a rock-arm, M, which is pivoted at *o* to the outer edge of the cutter and some distance in advance of the link *m*, the two points of attachment being in a diagonal line.

To the outer end of the rock-arm is pivoted a connecting-rod, N, that extends up and is jointed to an arm, S, pivoted at *r* to a cross-bar of the main frame. The arm S rests on top of a three-pointed cam-wheel, V, attached to the crank-shaft H. As the wheel turns, the cams will alternately raise and drop the arm S, and with it the shaker, with which it is connected.

By the construction of the parts as above described a peculiar motion is given to the shakers. In addition to the vertical up-and-down motion which such shakers ordinarily receive, they also have a rocking or tipping motion toward the center. This is produced by the two joints *m o*, which are out of line with each other. The inner end of the shaker, which is attached by link *m*, has less vertical movement than the outer end, which is attached to the rock-arm M. The rock-arm raises the outer side of the shaker and causes it to tilt or incline in a quartering direction inward. The tendency of the two shakers thus inclining inward toward each other as they are raised vertically is to roll the potatoes to the center as they are raised from the ground and leave them in a row behind the machine. Ordinary shakers, which simply vibrate up and down bodily, do not accomplish this result, but leave the potatoes scattered over the ground.

The shaft H is driven by a cord or chain, P, which passes around pulleys located, respectively, on the axle and shaft, or by other suitable means.

R is a rake, similar to a hay-rake, turning in bearings $v$ $v$ at the rear of the frame. It has curved teeth $w$ $w$, that reach to the ground, and is provided with a handle, $q$, by which it can be raised. It is thrown down in the rear of the machine to collect the vines and raised at intervals to dump the vines in bunches. When not in use, it is turned up over the machine.

Having described my invention, what I claim as new, and desire to secure by Letters Patent, is—

1. In a potato-digger, the combination of the cranked shaft H, provided with cam-wheels V V, the arms S S, jointed to the frame and resting in the cam-wheels, the two shakers L L, and the rock-arms M M, the shakers being attached to the cutters by links $m$ on one side and by the rock-arms N on the other, as herein shown and described.

2. In a potato-digger, the combination of the cranked shaft H, the forks I I, jointed to the cranks of the said shaft, the rock-bars K K, the cam-wheels V V on the shaft, the arms S S, resting on the cam-wheels, the connecting-rods N N, shakers L L, and rock-arms M M, the whole arranged to operate in the manner and for the purpose specified.

In witness whereof I have hereunto signed my name in the presence of two subscribing witnesses.

WILLIAM BRADFORD.

Witnesses:
P. A. COSTICH,
R. F. OSGOOD.